UNITED STATES PATENT OFFICE.

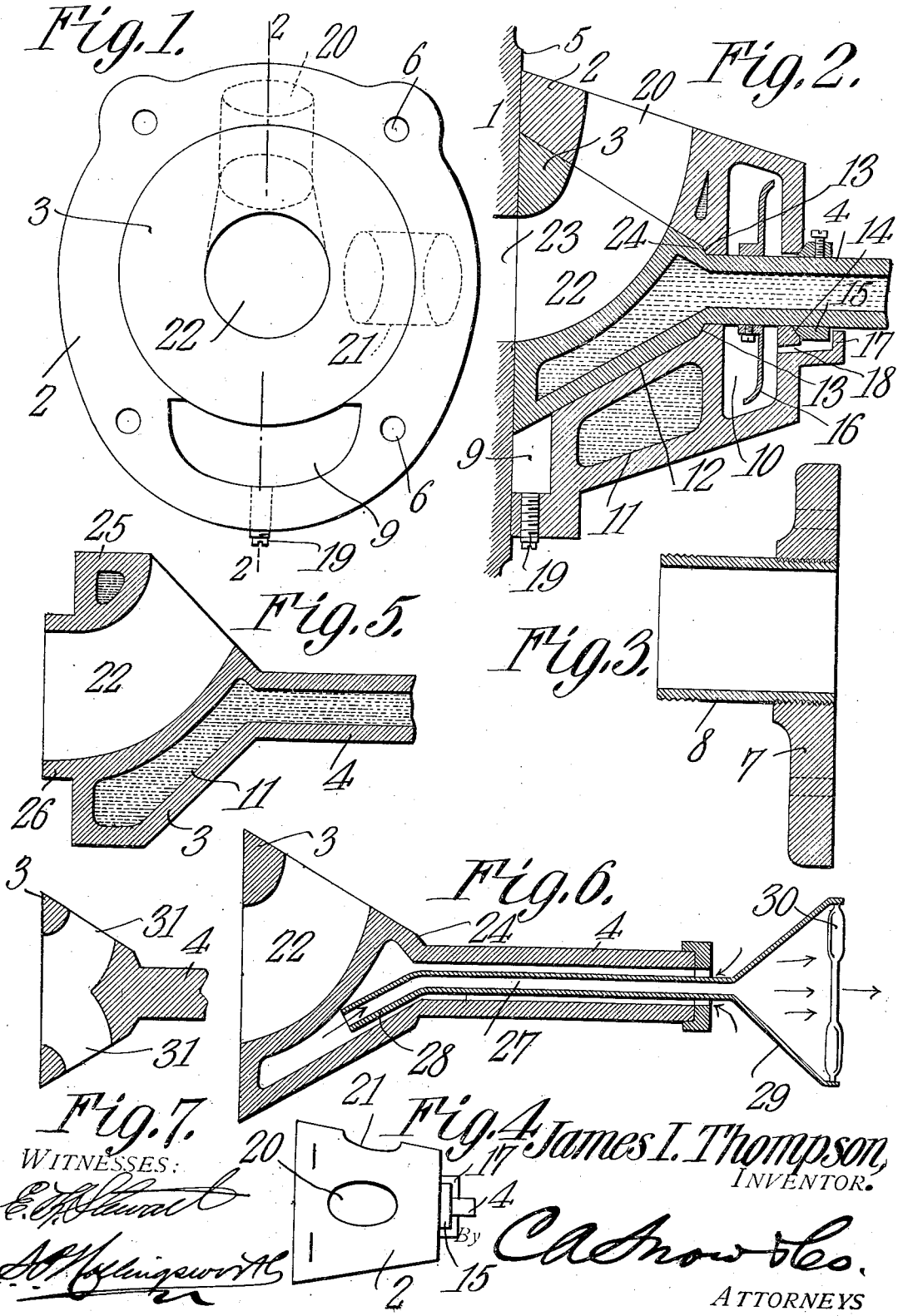

JAMES I. THOMPSON, OF CENTERVILLE, IOWA.

GAS-ENGINE VALVE.

No. 880,601.  Specification of Letters Patent.  Patented March 3, 1908.

Application filed March 30, 1907. Serial No. 365,573.

*To all whom it may concern:*

Be it known that I, JAMES I. THOMPSON, a citizen of the United States, residing at Centerville, in the county of Appanoose and State of Iowa, have invented a new and useful Gas-Engine Valve, of which the following is a specification.

This invention relates to a valve for an explosion engine and may be applied to engines of either the two or four cycle type, in the former type, however, the valve will be used only for gas supply.

The object of the invention is to provide an explosion engine, especially of the four cycle type, with a simple, accurate and positively acting rotary valve for controlling the entrance of explosive gas to the cylinder and facilitating quick exhaust therefrom of the products of combustion.

The object sought for is accomplished by means of a rotary valve of frusto-conical form seated in a valve casing bolted or otherwise secured to an engine cylinder. The valve casing is provided with inlet and exhaust ports which connect at the proper time through a port in the valve, as the latter rotates, with the compression end of the engine cylinder.

With this main object and others to be considered, the invention consists of the novel construction, combination and arrangement of parts, hereinafter described and definitely claimed.

In the accompanying drawing: Figure 1 is a view in elevation of the valve and valve casing as seen from the inner side. Fig. 2 is a longitudinal sectional view of the same on the line 2—2 of Fig. 1. Fig. 3 is a sectional view of a plate and tube by means of which the valve may be applied to engine cylinders of various types. Fig. 4 is an exterior view of the valve casing on a reduced scale. Fig. 5 is a sectional view of a modified form of valve. Fig. 6 is a longitudinal sectional view of the valve showing a means for cooling the same by air currents. Fig. 7 is a sectional view of the valve as arranged for a two cycle engine.

Similar numerals of reference indicate corresponding parts in all the figures of the drawings.

Bolted to an engine cylinder, indicated by the numeral 1, is a valve casing 2 provided with a seat for a rotary frusto-conical valve 3, having a valve stem 4 by means of which a continuous rotary motion is imparted to the valve at one-half the speed of the engine shaft in a manner familiar to all persons skilled in the art.

When an engine cylinder is primarily made for this valve, a seat 5 is cast therewith, on which the valve casing 2 is secured by bolts passing through bolt holes 6 in the valve casing and into the cylinder of the engine. When the valve is to be applied to a cylinder not especially adapted to it, a plate 7, (see Fig. 3) is employed to which the valve casing 2 is bolted, the plate in turn being attached to the cylinder by means of a short tube 8 screwed thereinto and into the plate 7.

The valve casing 2 is preferably cast in one piece, with an inner oil receptacle 9, an outer oil chamber 10, and a water jacket 11 to assist in keeping the valve cool. The valve seat 12 is of frusto-conical shape with the base towards the cylinder 1. At the frustum end of the valve seat a conical bearing 13 is formed to take the thrust of the valve 3; a similar bearing 14 is ground in the outer end of the valve casing for a coned ring 15, fitted adjustably on the valve stem 4. Between the conical bearings 13 and 14 is situated the outer oil chamber 10, circular in form, in which rotates a "wabble" disk 16 on the valve stem 4 which distributes oil to the coned bearings and to the valve as the valve stem rotates. The lower part of the coned ring 15 enters a pocket 17 on the outer end of the valve seat 2. Any excess oil applied to the bearing 14 by the "wabble" disk enters the pocket 17 and thence through an orifice 18 into the oil chamber 10. The inner oil receptacle 9 consists of a depression in the lower part of the valve casing 2; its inner wall being formed by the casing seat 5 on the cylinder. The oil receptacle 9 is kept full so that the valve 3 will run continually in a bath of oil and perfect the lubrication of the inner end of the valve. The oil can be removed when it becomes dirty through a hole in the bottom of the receptacle closed by a plug 19.

An inlet port 20 extends radially through the wall of the valve casing on one side and an exhaust port 21 on another side at an angle of ninety degrees to the inlet port. These ports are approximately elliptical in cross section, their long axes extending lengthwise of the casing, and curved slightly in the direction of their length.

The frusto-conical valve 3 is preferably made integral with the valve stem 4 and both are hollow for the reception of a cooling medium, either water or air. A curved port 22 is made through the valve 2 from the axial center of its base or inner end to its inclined side in position to register with the inlet and outlet ports 20 and 21, respectively. The valve port 22 is circular at its base but elliptical on its inclined side and its longitudinal curvature is a continuation of that of the inlet and outlet ports. The base of the valve 3 is approximately against the seat 5 but contact therewith is not necessary as there is no communication around the valve to either inlet or outlet ports, cylinder, or with the outside of the casing, except through the valve port 22 and a port 23 of equal size leading through the cylinder wall to the explosion chamber. Where the valve stem 4 joins the valve 3, a conical shoulder 24 is formed on the valve to abut against the bearing 13 in the valve seat and prevent the valve from binding, as the inclination of said bearing and shoulder is more abrupt than the side of the valve and its seat. It is well understood that the pressure produced by explosion and compression tends to force the valve tightly in its seat, and but for the bearing 13 the possibility of the valve binding is very great.

A valve constructed, as above described, will wear for a very long time and never leak, as the pressure is always in a direction to hold the valve closely in its seat, and its movement is a continuous rotary one. Foreign substances cannot possibly get to the bearing surface of the valve to scratch it, and any looseness can be taken up by the adjustable conical ring 15.

The bearing shoulders 24 may be dispensed with by changing the shape of the valve as indicated in Fig. 5, where it will be noted that the angle of inclination of the valve with respect to an axial plane is greater than in the first described form, and that the inner end of the valve is provided with a cylindrical portion 25. It may also be desirable on some occasions to extend the port 22 in the valve a little in advance of the base which may be done by means of a flange 26, see Fig. 5, forming thereby an additional bearing.

Instead of cooling the valve with water, air cooling may be substituted. One way of doing this is illustrated in Fig. 6. As there shown, a tube 27 of less diameter than the bore of the valve stem 4 is supported axially in said bore with its inner end 28 extended into the hollow valve 2. The outer end of the tube 27 is funnel shaped as at 29 and carries at its mouth a number of fan blades 30 which exhaust hot air from within the valve 2, cold air entering around the tube 27 to supply its place.

Another means for cooling the valve by air, especially in connection with air cooled engines, is to mount the valve casing on the plate 7, and attach said plate to the cylinder by the tube 8 as heretofore described. The valve will thus be out of contact with the cylinder and not subject to heat either by radiation or convection.

At Fig. 7 is shown a form of valve to be used with a two cycle engine. It is similar in all respects to the valve 2 except that it has two diametrically placed ports 31 instead of a single port 22.

The operation of valves of this type is well known to those familiar with explosion engines and a description thereof will not be necessary.

Having thus described the invention what is claimed is:—

1. A valve for explosion engines comprising a valve casing having a frusto-conical valve seat therein and a bearing surface at the frustum end of said valve seat inclined at an angle different from that of the seat, and a rotary frusto-conical valve fitted to said seat and having a shoulder at the same angle as, and abutting against said bearing surface to take the thrust of the valve.

2. A valve for explosion engines comprising a valve casing having an open frusto-conical valve seat in one end the frustum end of said seat being innermost and terminating in a bearing surface inclined at a different angle from that of said valve seat, an inlet port and an exhaust port extending through the casing from the valve seat, and a rotary frusto-conical valve fitted to said valve seat having a curved port extending from its base through the side of the valve in position to register with said inlet and outlet ports, and a tapered shoulder at the smaller end of the valve inclined at the same angle as, and abutting against, said inclined bearing surface to take the thrust of the valve.

3. A valve for explosion engines comprising a separable casing having a flat bearing face onto which opens a frusto-conical valve seat and an oil receptacle below said seat and communicating therewith, an inlet port and an outlet port passing at an angle to each other through the side of said casing into the valve seat, and a rotary frusto-conical valve fitted in said valve seat with its base towards the explosion chamber and extending into said oil receptacle and having a curved port therethrough, one end of said port opening through the base of the valve at its axial center and the other end through the side of said valve in position to register with the inlet and exhaust ports when the valve rotates.

4. A valve for explosion engines comprising a valve casing having a closed oil chamber formed therein at one end and a frusto-conical valve seat open at its other end, the smaller inner end of said valve seat next the oil chamber terminating in a tapered bearing surface, an inlet port and an exhaust port leading through the wall of said casing from the valve seat, a rotary frusto-conical valve fitted to said valve seat provided with an axial stem projecting from its smaller end through siad closed oil chamber, a tapered shoulder to bear against said tapered bearing surface, and a curved port continuously open at the base of said valve to the explosion chamber and at its opposite end in position to register as the valve rotates with the inlet and exhaust ports, and an adjustable bearing ring adapted to be seated in a conical bearing on the outside of said casing.

5. A valve for explosion engines comprising a valve seat having a closed oil chamber formed therein at one end, an open frusto-conical valve seat in its other end, and an open oil receptacle in the same end below said valve seat, an inlet port and an exhaust port extending from the valve seat through the wall of the casing, a rotary frusto-conical valve fitted in said valve seat and having an axial stem extending through the closed oil chamber, an adjustable coned bearing ring on said valve stem adapted to seat in a bearing on the outside of said casing, means on said valve stem within said oil chamber for distributing oil to the bearings and to the valve, and a pocket at the outer end of the casing for collecting excess oil from the outer bearing.

6. A valve casing for explosion engines having a flat face adapted to be bolted to a like face, a frusto-conical valve seat extending inwardly from said face and communicable with the explosion chamber, an oil receptacle opening on said face below the frusto-conical valve seat and connecting with said seat, a closed oil chamber at the outer end, and an inclined thrust bearing surface at the frustum end of said seat the angle of which is different from that of said valve seat.

In testimony that I claim the foregoing as my own, I have hereto affixed my signature in the presence of two witnesses.

JAMES I. THOMPSON.

Witnesses:
H. E. LUTHER,
C. E. LUTHER.